UNITED STATES PATENT OFFICE.

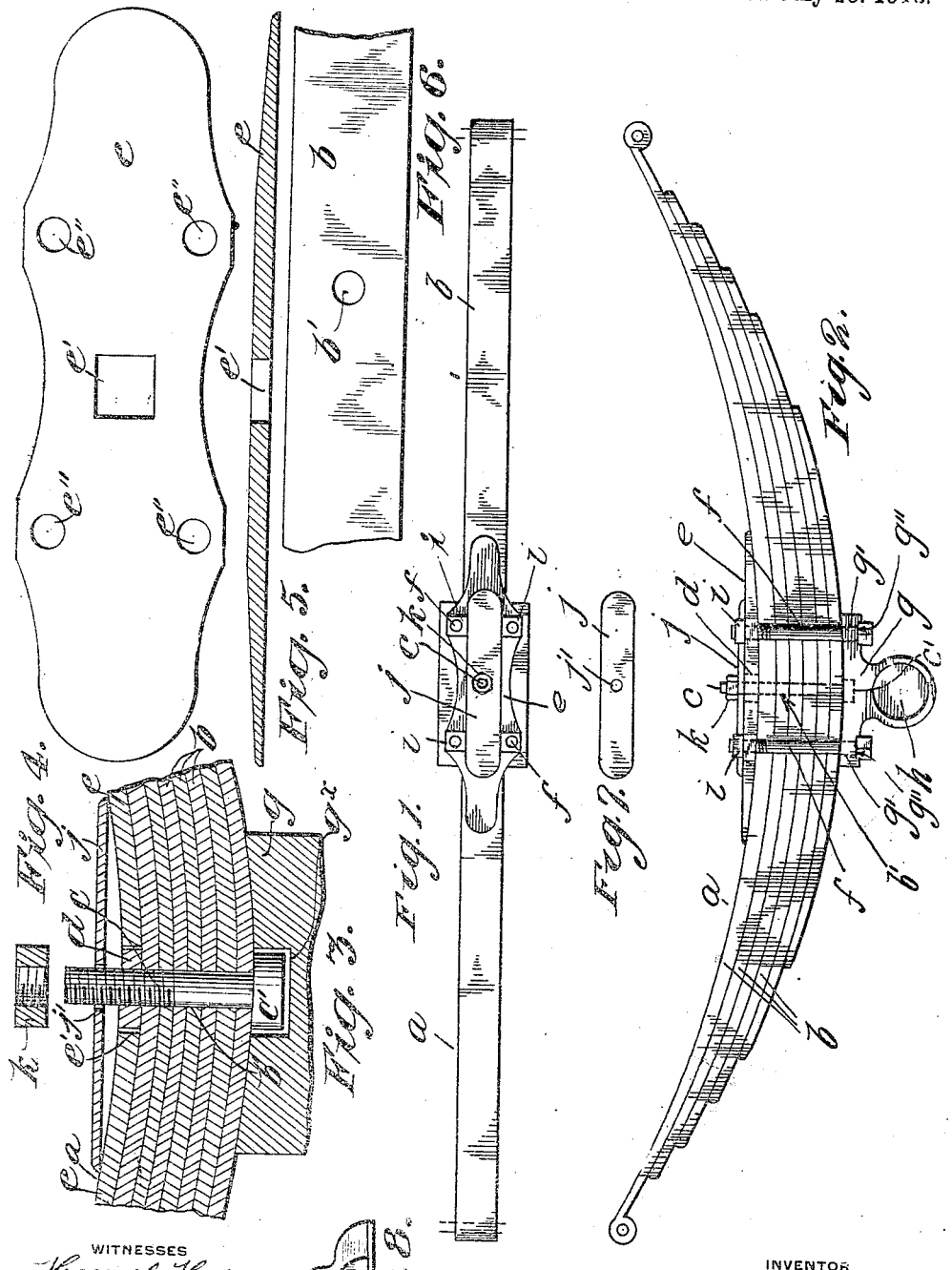

THOMAS A. HOOVER, OF FRESNO, CALIFORNIA.

VEHICLE-SPRING.

1,067,480.

Specification of Letters Patent.

Patented July 15, 1913.

Application filed January 24, 1912. Serial No. 673,139.

*To all whom it may concern:*

Be it known that I, THOMAS A. HOOVER, a citizen of the United States, residing at Fresno, in the county of Fresno and State of California, have invented certain new and useful Improvements in Vehicle-Springs, of which the following is a specification, reference being had to the accompanying drawings.

This invention relates to improvements in vehicle springs; and an object of this invention is the provision in a vehicle spring of means for fastening the leaves of the same firmly together and for securely fastening the spring as a whole to the spring lock, the bolts and nuts used being locked against accidental turning.

In the drawings illustrating the principle of this invention and the best mode now known to me of applying that principle, Figure 1 is a plan and Fig. 2 is an elevation of a semi-elliptical spring embodying this invention; Fig. 3 is a fragmentary section showing the manner in which the leaves of the spring are held together; Fig. 4 is a plan and Fig. 5 is a central vertical section through the clip-plate; Fig. 6 is a fragmentary detail showing a portion of a leaf of the spring; Fig. 7 is a detail showing the spring lock-plate; and Fig. 8 is a detail hereinafter referred to.

Each of the leaves $b$ of the semi-elliptical spring $a$ is formed with a central hole $b'$ through which is passed the shank of the bolt $c$. Upon the latter is then screwed the nut $d$, whereby the leaves $b$ of the spring are tightly drawn together. Over the projecting upper end of the bolt $c$ there is now passed a clip-plate $e$ formed with a square central hole $e'$ and with four bolt holes $e''$ for the clip-bolts $f$. The nut $d$ fits snugly within the square hole $e'$ of the clip-plate $e$, which therefore serves to prevent the rotation of the nut $d$. The spring $a$ rests upon the usual spring-block $g$ in which is mounted the axle end $h$ and the top face of which is formed with a central countersink or socket $g^x$ adapted to receive the head $c'$ of the bolt $c$. The spring-block $g$ is furthermore formed with holes $g'$ at its corners through which pass the bolts $f$ and with countersinks $g''$ in its lower face in which are fitted the heads of the bolts $f$. These countersinks prevent the latter from turning; and upon the upper ends of the same are screwed the nuts $i$. Arranged centrally between the latter is a spring lock-plate $j$ formed with a central hole $j'$ through which projects the threaded upper end of the bolt $c$, upon which is screwed the nut $k$. The upper face of the clip-plate $e$ is slightly dished (this dish is exaggerated for purposes of illustration in Fig. 3); and, when the nut $k$ is screwed down upon the spring lock-plate, the resiliency of the latter causes a pressure to be exerted upon the nut $k$, which is then held in place by the friction existing between the spring lock-plate and the nut. It is to be observed further that the spring lock-plate serves to prevent the turning of the nuts $i$ on the upper ends of the bolts $f$.

From the foregoing arrangement of parts, it will be seen that the parts of the spring are firmly secured together and interlocked, whereby looseness and rattling of these parts are obviated.

I claim:

1. A vehicle spring comprising a plurality of leaves; a bolt which passes through the latter; a nut which co-acts with said bolt to fasten said leaves together; a clip-plate which locks said nut in place; a spring-block; clip-bolts which pass through said spring-block and clip-plate; nuts which co-act with said clip-bolts to fasten said spring-block and clip-plate together; and means for locking the last-named nuts against turning.

2. A vehicle spring comprising a plurality of leaves; a bolt which passes through the latter; a nut which co-acts with said bolt to fasten said leaves together; a clip-plate which locks said nut in place; a spring-block; clip-bolts which pass through said spring-block and clip-plates; nuts which co-act with said clip-bolts to fasten said spring-block and clip-plate together; and a lock-plate for locking the last-named nuts against turning.

3. A vehicle spring comprising a plurality of leaves; a bolt which passes through the latter; a nut which co-acts with said bolt to fasten said leaves together; a clip-plate which locks said nut in place; a spring-block; clip-bolts which pass through said spring-block and clip-plate; nuts which co-act with said clip-bolts to fasten said spring-block and clip-plate together; a lock-plate for locking the last-named nuts against turning; and a retaining device which co-acts with the first-named bolt to hold said lock-plate in position.

4. A vehicle spring comprising a plurality of leaves; a bolt which passes through the latter; a nut which co-acts with said bolt to fasten said leaves together; a clip-plate which locks said nut in place; a spring-block; clip-bolts which pass through said spring-block and clip-plate; nuts which co-act with said clip-bolts to fasten said spring-block and clip-plate together; a spring lock-plate which overlies said clip-plate and which locks the last-named nuts against turning, there being an interval between said lock-plate and clip-plate; and means for holding said spring lock-plate pressed toward said clip-plate.

5. A vehicle spring comprising a plurality of leaves; a bolt which passes through the same; a spring-block formed with a recess in which the head of said bolt is held against turning; a nut which co-acts with said bolt to fasten said leaves together; a clip-plate provided with means for locking said nut in place; and means for fastening said clip-plate and spring-block together.

6. A vehicle spring comprising a plurality of leaves; a bolt which passes through the same; a spring-block formed with a recess in which the head of said bolt is held against turning; a nut which co-acts with said bolt to fasten said leaves together; a clip-plate provided with means for locking said nut in place; fastening means for binding said clip-plate and spring-block together; and a locking device for locking said fastening means in operative position.

Signed at the city and county of San Francisco, State of California, this 30th day of December, A. D., 1911, in the presence of the two undersigned witnesses.

THOMAS A. HOOVER.

Witnesses:
E. DOWNING,
B. WILSON.